Figure 1:
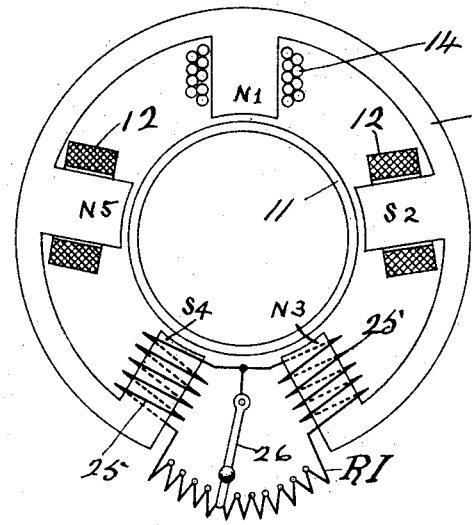

No. 631,225. Patented Aug. 15, 1899.
G. F. PACKARD.
ELECTRIC METER.
(Application filed Oct. 10, 1898.)

(No Model.) 3 Sheets—Sheet 1.

WITNESSES:
Adelaide Kearns
Edward F. Tierney

G. Frederick Packard
INVENTOR

BY Chapin & Denny
HIS ATTORNEYS.

No. 631,225. Patented Aug. 15, 1899.
G. F. PACKARD.
ELECTRIC METER.
(Application filed Oct. 10, 1898.)
(No Model.) 3 Sheets—Sheet 2.
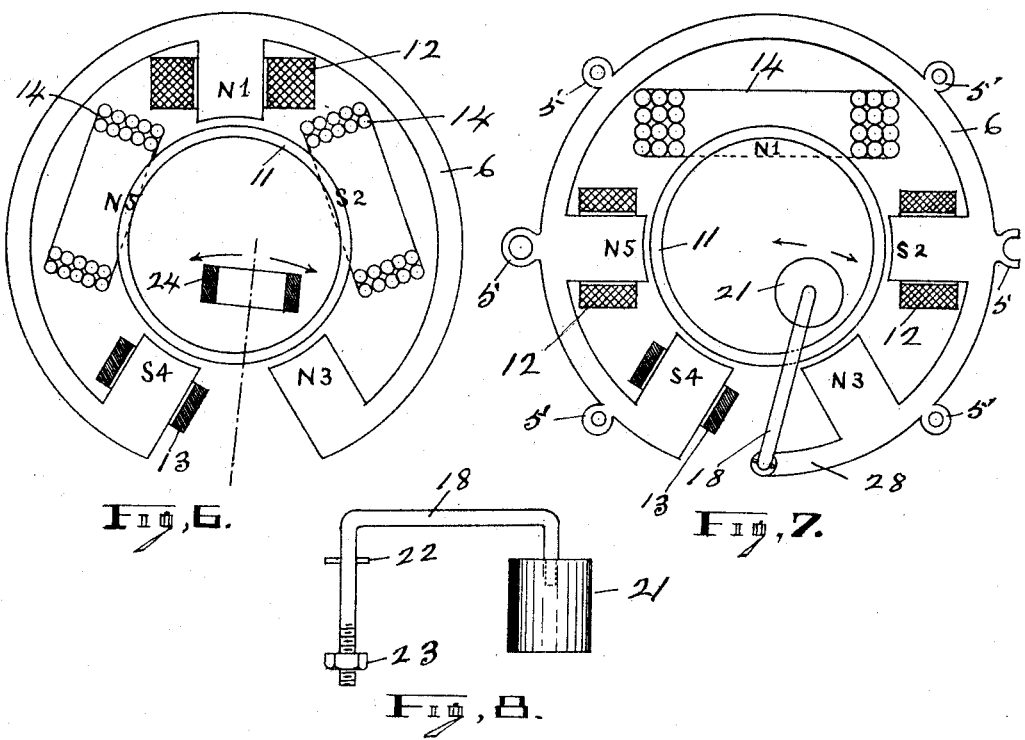
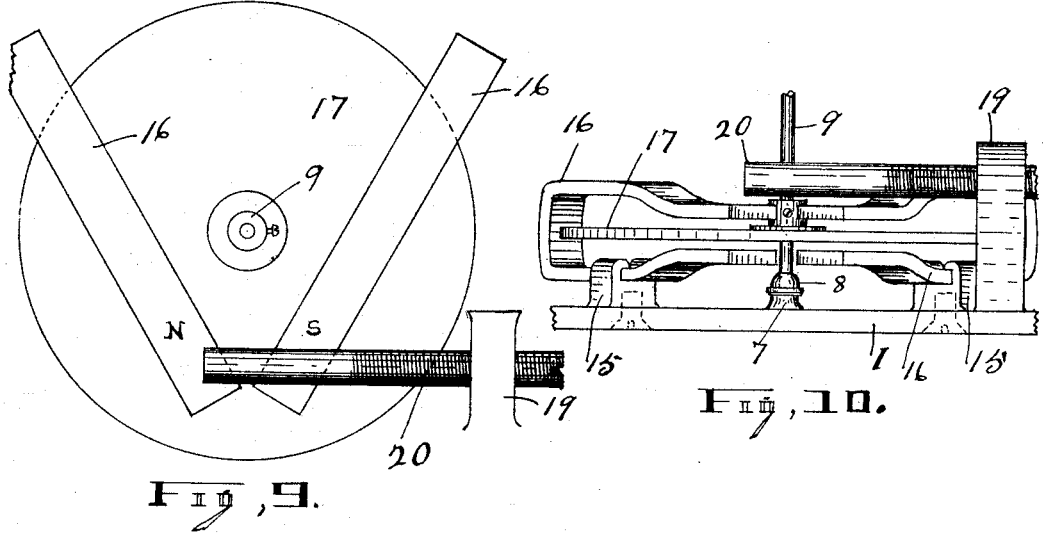
WITNESSES:
Adelaide Kearns.
Edward F. Kerney.
G. Frederick Packard INVENTOR
BY Chapin & Denny
HIS ATTORNEYS.

No. 631,225. Patented Aug. 15, 1899.
G. F. PACKARD.
ELECTRIC METER.
(Application filed Oct. 10, 1898.)

(No Model.) 3 Sheets—Sheet 3.

WITNESSES:
Adelaide Kearns
Edward F. Tierney

G. Frederick Packard INVENTOR
BY Chapin & Denny
HIS ATTORNEYS.

UNITED STATES PATENT OFFICE.

GRANVILLE FREDERICK PACKARD, OF FORT WAYNE, INDIANA.

ELECTRIC METER.

SPECIFICATION forming part of Letters Patent No. 631,225, dated August 15, 1899.

Application filed October 10, 1898. Serial No. 693,082. (No model.)

*To all whom it may concern:*

Be it known that I, GRANVILLE FREDERICK PACKARD, a citizen of the United States, residing at Fort Wayne, in the county of Allen, in the State of Indiana, have invented certain new and useful Improvements in Electric Meters; and I do hereby declare that the following is a full, clear, and exact description of the invention, which will enable others skilled in the art to which it appertains to make and use the same, reference being had to the accompanying drawings, which form part of this specification.

My invention relates to improvements in electric meters for measuring the energy consumed in alternating electric circuits and relates to that class in which a rotary armature is set in motion by the inductive action of two or more fields of differing phase.

The object of my present invention is to provide an induction-motor meter of simple and economical construction and increased efficiency, adapted to dispense with all iron and windings within the armature, possessing improved means of regulation and a novel calibrating device of great simplicity, and adapted to employ removable and machine-wound coils and to produce a given torque with a reduced expenditure of energy.

The principal novel features of my present invention are the form and arrangement of the multipolar field-magnet frame adapted to permit the employment of a large variety of means for regulating the torque of the revoluble armature, an improved torque-regulator for calibrating, a magnetic calibrating device for use in connection with a magnetic drag, the elimination from the meter of all magnetic iron except the field-magnet frame, and my improved method of producing rotation in the revoluble armature.

The principal operative elements in my invention are, a five-pole field-magnet frame on which are mounted the main-circuit and shunt coils in inductive relation to the revoluble armature, a revoluble metallic armature, preferably of aluminium, adapted to be actuated by the said coils, a torque-regulator of novel construction, a micrometric calibrating device, and an improved means for supporting the field-magnet frame and for securing its component laminæ by which local currents in the said frame are obviated.

Similar reference letters and numerals indicate like parts throughout the several views of the accompanying drawings, in which—

Figure 2:
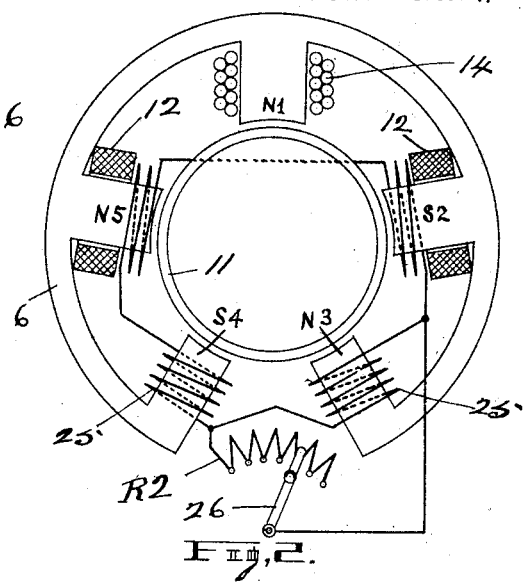
Figure 3:
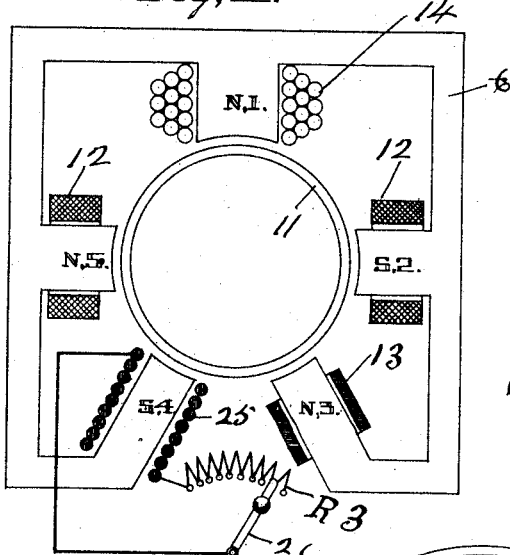
Figure 4:
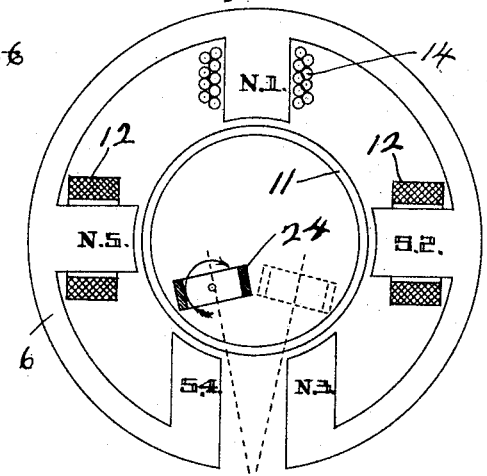
Figure 5:
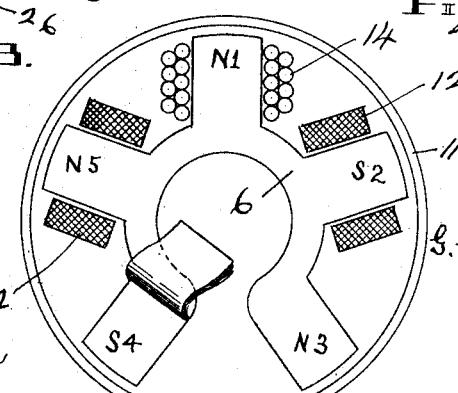
Figure 11:
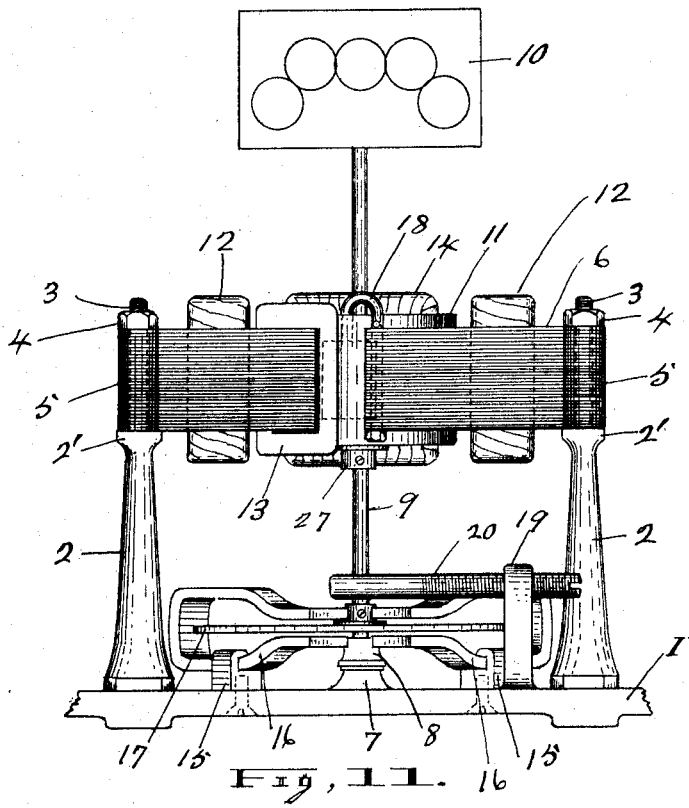
Figure 12:
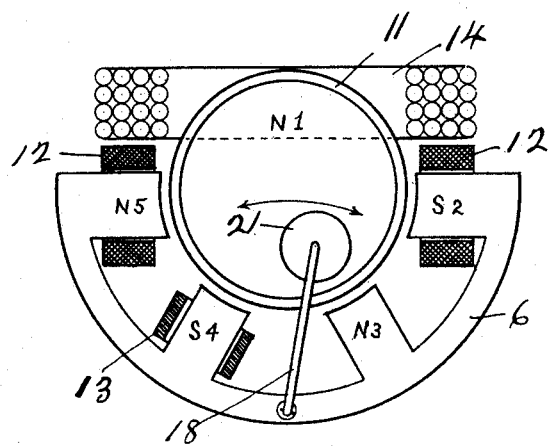

Figures 1, 2, and 3 are diagrammatic views of my invention, showing the preferred arrangement of the shunt and main-circuit coils and also showing various means for varying the relative field strength of the induced poles $S^4$ and $N^3$. Fig. 4 is a similar view showing secondary means for varying the relative field strength of the said induced poles. Fig. 5 is a similar view showing a modified relative arrangement of the cylindrical armature and field-magnet frame. Fig. 6 is a similar view showing a modified arrangement of the energizing-coils specially adapted for three-wire systems of distribution. Fig. 7 is a similar view with one of the polar projections omitted and shows the relative arrangement of the torque-regulator. Fig. 8 is a detail side view of my improved torque-regulator. Fig. 9 is a plan view of my improved magnetic calibrating device, showing its position relative to the two magnet-poles N and S. Fig. 10 is a front elevation of my calibrating device. Fig. 11 is a front elevation of an approved form of my invention. Fig. 12 is a diagrammatic view showing a modified form of my five-polar system by a modified form of the field-magnet frame and a modified arrangement of one of the energizing-coils.

My improvement is detachably mounted upon any suitable base 1, Fig. 11, which is preferably a part of a proper containing-case of common form. In this base 1 the upright posts or standards 2 are rigidly mounted by a screw-threaded connection. These posts 2 have their upper ends reduced to be received by the apertured diametric ears 5', Fig. 7, of the laminated field-magnet frame for the support of said frame. The said posts are also provided with the shoulders 2', upon which the said frame rests. Upon the upright boss 7 of said base 1 is mounted a hollow cap 8, containing a screw-plug and a jeweled screw, (not shown,) altogether forming a jewel-bearing fully shown and described in a former patent issued to me for an electric meter, numbered 587,015 and dated July 27, 1897, and therefore requiring no detailed description here. In this jewel-bearing the pointed lower end of the upright revoluble armature-shaft 9 is loosely mounted, the upper end of said shaft being operatively connected with a proper registering-train 10. At a suitable point on said shaft 9 is rigidly fixed by a set-screw or other proper manner a sleeve 27, having upon its upper end an integral annular flange upon which the armature 11 is properly fixed, the said armature being preferably closed at its lower end. The said armature is thus conveniently reversible, as the said annular flange is secured to the outer face of said closed lower end. To the base 1 are secured by proper screws the holding-clamps 15, in which are rigidly mounted the permanent magnets 16, between the adjacent poles of which is arranged a retarding-disk 17, which is rigidly fixed to the said shaft 9 in the same manner as the said armature above described. At a suitable point on the said base 1 is arranged an integral upright lug 19, having a screw-threaded opening in its upper end. In this screw-threaded opening is mounted an externally-screw-threaded rod 20, constituting a magnetic calibrating device capable of a micrometric adjustment and adapted for shunting the flux of the permanent magnets. In an extension 28 of the said field-magnet frame 6 is pivotally mounted a U-shaped supporting-arm 18, Figs. 7, 8, and 11, having upon its screw-threaded outer end a holding-nut 23 and a pin 22, adapted to limit the downward movement of said end. The other end of said arm is rigidly secured in the upper end of a solid metallic conducting-cylinder 21, which is thus suspended or arranged within the said armature and adjacent to the poles $S^4$ and $N^3$, thus constituting a torque-regulator adapted to counteract the well-known tendency of the armature to run too slowly upon light loads. This regulator is horizontally adjustable about a vertical axis, as described. The laminated field-magnet frame or yoke is horseshoe-shaped or segmental in form and is provided upon its inner perimeter with a plurality of polar projections, upon which are wound or mounted the energizing-coils. The mere form or contour of this frame 6 is immaterial, and may be rectangular, as in Fig. 3, or any other form desired, the essence of my present invention residing in a construction and arrangement whereby a five-pole magnetic system is secured.

The series coil 14 is either mounted upon the polar projection $N'$, Figs. 1 to 5, inclusive, or it may be so arranged as to establish a pole $N'$, as seen in Figs. 7 and 12, or two alternate series coils may be employed to establish the poles $N^5$ and $S^2$, as shown in Fig. 6. This latter form is especially adapted for use in three-wire systems of distribution.

The closed secondary 13 is mounted upon either one or both of the polar projections $S^4$ and $N^3$, as shown in Figs. 3, 6, 7, 11, and 12, for the purpose of varying the torque of the armature in a well-understood manner.

The secondary windings 25, Figs. 1, 2, and 3, connected to suitable resistances $R'$, $R^2$, and $R^3$, are employed as alternative means for governing the relative field strength of the poles $S^4$ and $N^3$.

An axially-adjustable secondary 24 may be employed with equal efficiency instead of the above-described torque-regulator.

In Fig. 5 is shown a simple and efficient means for producing an inequality in the field strength of the poles at $S^4$ and $N^3$, consisting of a folding back or removal of a portion of the laminæ composing one of the said poles, whereby the armature-torque is augmented.

The operation of my invention thus described is briefly stated as follows: I secure an accurate registration of the energy consumed by combining the variable torque due to a main-circuit field upon one side of the armature with a constant torque due to an asymetric field upon another part thereof. The effect of thus combining the constant with the variable torque is to produce a resultant turning moment which will not be strictly proportional to the energy consumed, but which will be strongest in proportion upon light loads. The necessity of such an arrangement is obvious on account of the well-known tendency of a meter to under-register upon light loads.

The five-pole form of field-magnet frame, which I claim as my invention, adapts itself readily to a large variety of means by which the result referred to may be obtained, and on the first sheet of drawings of this application I have shown five distinct methods whereby the relative strength of the adjacent poles $N^3$ and $S^4$ may be varied, thus creating an unbalanced or asymetric field. Those skilled in the art will recognize poles $N^3$ and $S^4$ to be induced and of alternate polarity by virtue of their contiguous position and polar relation to poles $S^2$ and $N^5$ and will also perceive that if a strict balance of magnetic stress obtains in the induced poles there will be no effective torque at no load, owing to the equilibrium of the opposing turning moments produced upon the armature by the poles $N^3$ and $S^4$. It will also be apparent that if any means are employed by which a difference of phase or an inequality of field strength in the poles $N^3$ and $S^4$ is created an effective turning moment is produced on the armature.

My improved meter operates by the simultaneous attraction and repulsion of the eddy-current field or fields established in a revoluble metallic armature by the inducing field or fields.

In the five-pole magnet-frame for wattmeters, modifications of which I have shown, I prefer to place the shunt-coils 12 one on each side of a main-circuit coil 14, the said shunt-coils producing alternate polarity in their respective poles. This specific arrangement and connection gives an ideal phase condition, producing a high self-inductive effect and lagging current in the shunt-coils and a current in the main-circuit coil practically coincident with the impressed electromotive force. For certain conditions, however, as in the case of a three-wire meter, it is preferable to locate the shunt-winding between two alternate main-circuit coils.

The direct function of my cylindric torque-regulator is to produce an inequality in the field strength of the two induced poles $S^4$ and $N^3$, the said inequality producing a constant augmentation of the armature-torque. It is to secure this asymmetry of the magnetic field upon one side of the armature that I have devised special methods applicable to my improved five-pole form of field-magnet. As a means for producing an asymmetric field upon one side of the armature I do not wish to limit myself to the means herein described; but I claim as my own the special arrangements for producing field-asymmetry which are shown in the first sheet appended—namely, by use of variable resistance and in Fig. 5 by laying back or entirely removing a portion of the laminæ which constitute the magnet-frame.

While nearly any form of secondary would be effective as a regulator, I prefer for the purpose a solid sphere or vertical cylinder, for the reason that the currents induced in these forms are proportional to the intercepted flux, while in the conventional forms of secondary this condition obtains only as we assume a fixed position relative to the direction of the magnetic flux.

Obviously the means shown in Figs. 1, 2, and 3 for controlling the relative field strength of poles $N^3$ and $S^4$ are adapted when desired to regulate the armature-torque at a distance.

Having thus described my invention, what I desire to secure by Letters Patent, is—

1. In an electric meter or motive device for alternating currents, a laminated field-magnet structure comprising five polar projections integral with a magnetic yoke.

2. In an electric meter for alternating currents, a laminated field-magnet structure comprising a segmental magnetic yoke having five integral polar projections; in combination with a cylindrical metallic armature in inductive relation to the said polar projections; a recording mechanism; and a magnetic retarding device.

3. In an electric wattmeter for alternating currents, the combination with a cylindrical aluminium armature; a magnetic retarding device; and a registering-train, of a field-magnet structure comprising a magnetic yoke having five integral inwardly-pointing polar projections; shunt-coils upon two alternate projections; a main-circuit-wound pole between the two shunt-wound poles; and an axially-adjustable closed secondary supported within the armature adapted to intercept a portion of the magnetism emanating from one or both of the unwound poles.

4. In a recording-wattmeter for alternating currents, a registering-train; a magnetic retarding device; and a five-pole magnetic system having a single pole established by a main-circuit coil, two alternate poles of opposite sign embraced by shunt-coils, two adjacent induced poles, one of which is embraced by a closed secondary, and a conducting-mass or closed secondary adjustably supported within the armature in the path of the magnetic flux and adapted to govern the relative field strength of the said induced poles.

5. In an alternating-current meter, a regulator, adapted to counteract the tendency of an armature to run too slowly upon light loads, comprising essentially a solid, vertical, conducting-cylinder or closed secondary mounted directly upon one end of a U-shaped supporting-arm, the said cylinder arranged within the armature, being adjustable about a vertical axis without the armature.

6. In an alternating-current meter or motive device of the class described, a regulator, adapted to impart to the armature a torque or counter-torque, comprising a U-shaped metallic rod provided with a conducting-cylinder or closed secondary upon one end and means for securing the same in position.

7. In an alternate-current wattmeter, the combination with a revoluble metallic armature, of a five-pole field-magnet having two alternate shunt-wound poles of unlike sign, a single main-circuit-wound pole between the shunt-wound poles and two adjacent poles of unlike signs; all the poles being related inductively to the said armature.

8. In a recording-wattmeter for alternating currents a magnetic system adapted to actuate a cylindrical metallic armature, the said system comprising a single main-circuit-wound pole, on each side of which is a shunt-wound pole; two adjacent, induced poles of unlike signs; means for governing the relative field strength of the said induced poles consisting in the use of a closed secondary adjustably mounted within the armature-shell, and adapted to intercept a portion of the flux emanating from one or both of the said induced poles.

9. In a recording-wattmeter for alternate currents, the combination with a revoluble, cylindrical, metallic armature and magnetic retarding device of a magnetic system comprising a magnetic field of force established by the main circuit on each side of which is a shunt-generated field of force; a pair of adjacent induced poles of alternate polarity located between the said shunt-generated fields of force; and means for governing the relative strength of said induced poles consisting in the employment of a conducting mass or closed secondary adjustably mounted within the armature-shell and adapted to intercept a portion of the magnetic flux emanating from one or both of the said induced poles.

10. In a recording-wattmeter for alternating currents a five-pole laminated, field-magnet structure energized by shunt and main-circuit sources two of whose alternate poles are excited from one source, one of whose poles is energized from the alternative source, two of whose poles are induced by contiguity with energized coils and means for disturbing the magnetic equilibrium, in the said induced poles; in combination with a revoluble, metallic armature, inductively related to all of the said poles; a magnetic retarding device and a recording mechanism.

11. The combination, in a recording-wattmeter for alternating currents, of an adjustable magnetic retarding device; recording mechanism; and a revoluble metallic armature; with a magnetic system energized by shunt and main-circuit sources comprising a magnetic field established by one of the said sources, on each side of which is a magnetic field established by the alternative source; two adjacent poles, polarized by contiguity with energized coils and means for destroying the magnetic equilibrium of the said adjacent poles.

12. The process of producing rotation in a revoluble metallic armature for motor-meters, consisting in the employment of a pair of alternately-located and alternately-polarized magnetic fields, the said fields combining with a directly-energized coil or pole-piece upon one side of the said pair and an asymmetrical magnetic field upon the other side thereof, to produce separate turning movements whereby the said armature is caused to rotate.

13. In an electric meter, a horizontally-adjustable screw-threaded bar of magnetic material mounted or arranged in operative relation to the poles of the retarding magnet or magnets for the purpose of diverting a portion of the magnetic flux thereof.

Signed by me at Fort Wayne, Allen county, State of Indiana, this 7th day of October, A. D. 1898.

G. FREDERICK PACKARD.

Witnesses:
M. G. WEBBER,
ADELAIDE KEARNS.